Jan. 8, 1929.
L. T. MEDHOLDT
1,698,412
MOLDER
Filed May 22, 1925 6 Sheets-Sheet 1
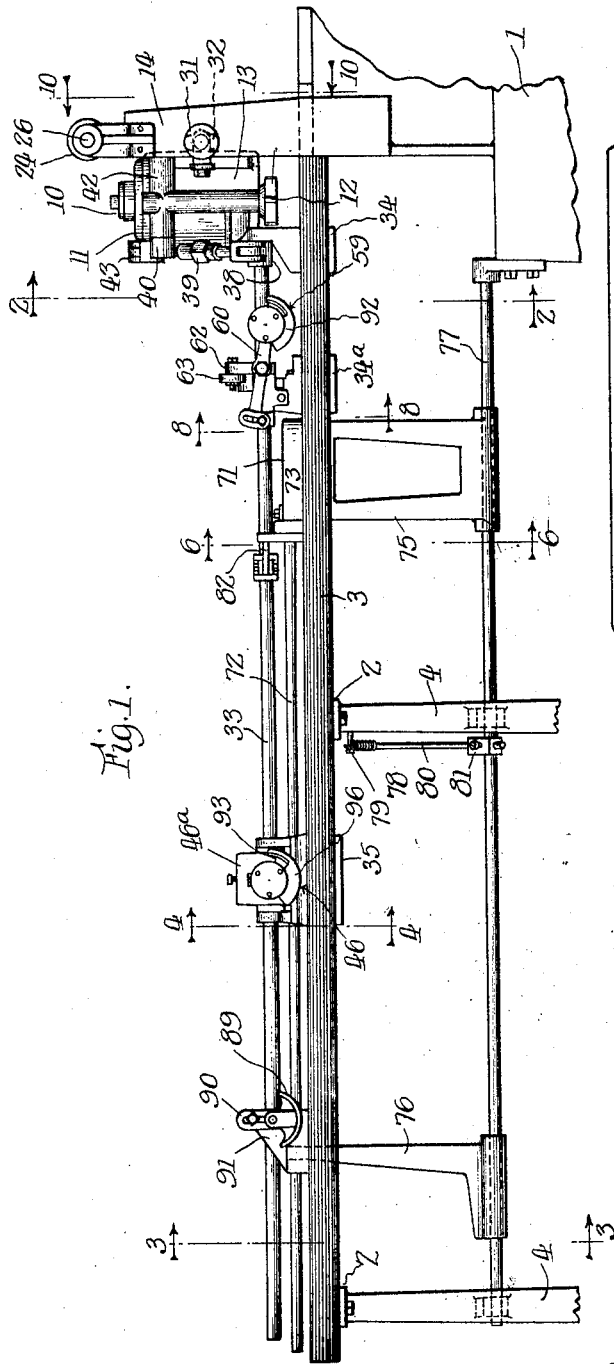
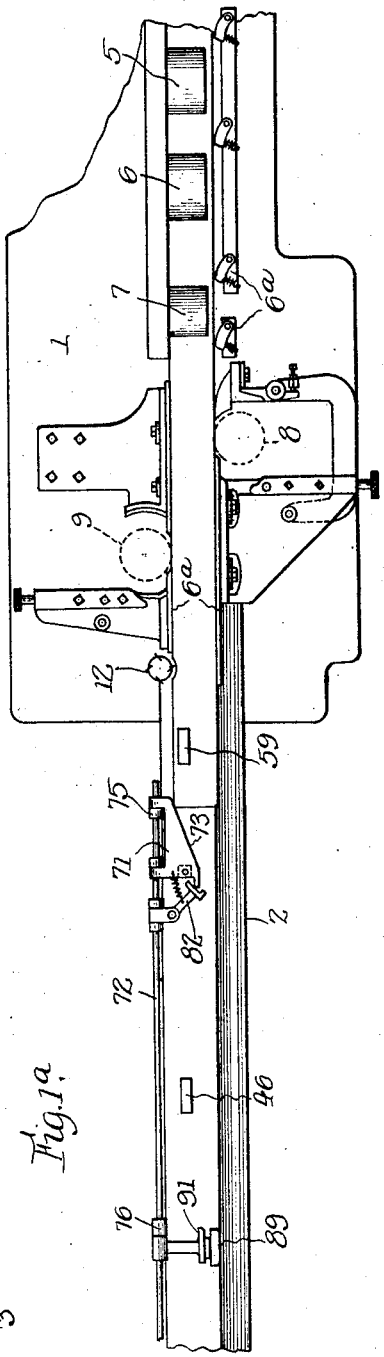
Inventor:
Louis T. Medholdt,
By Chindahl, Parker & Carlson
Attys.

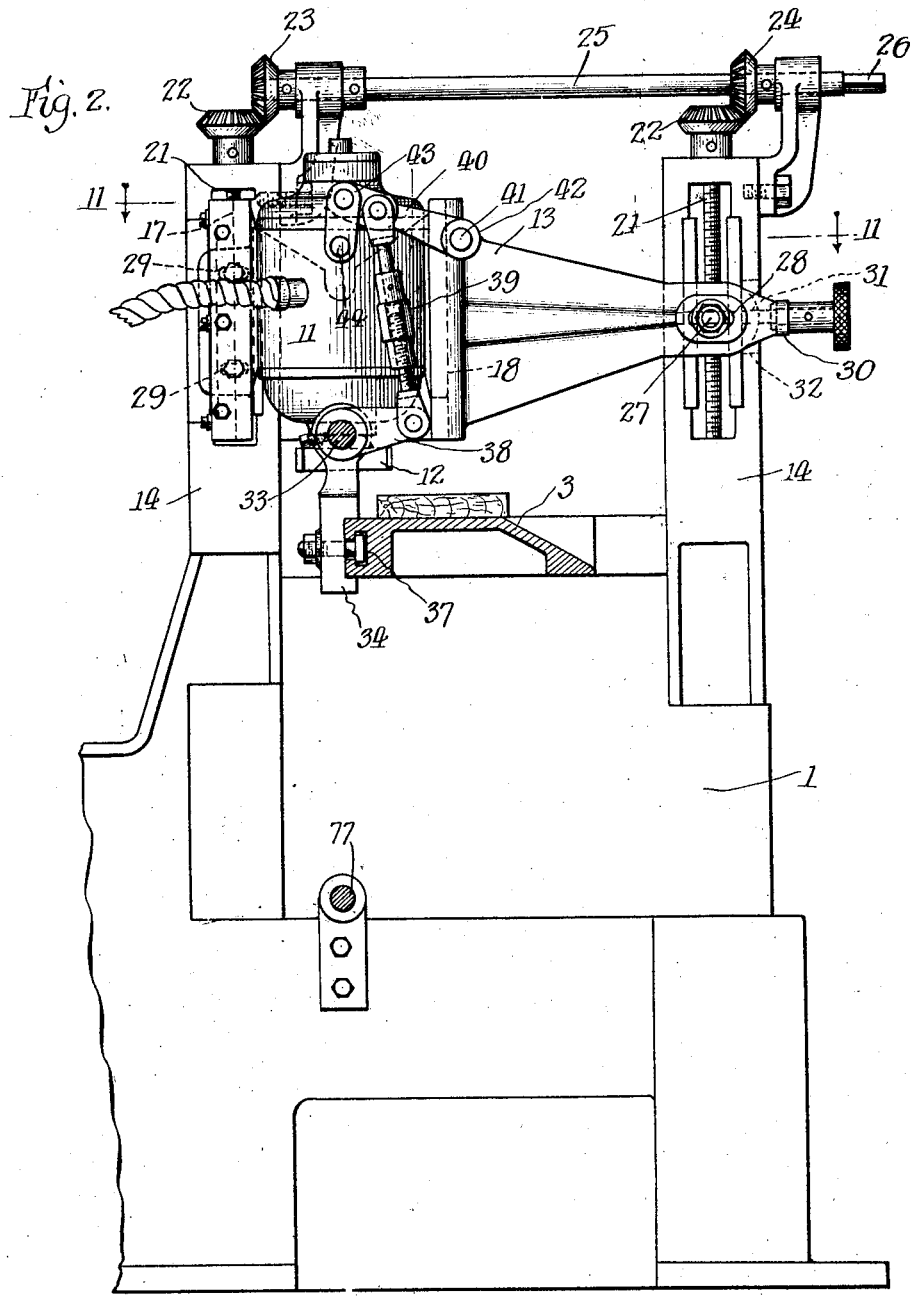

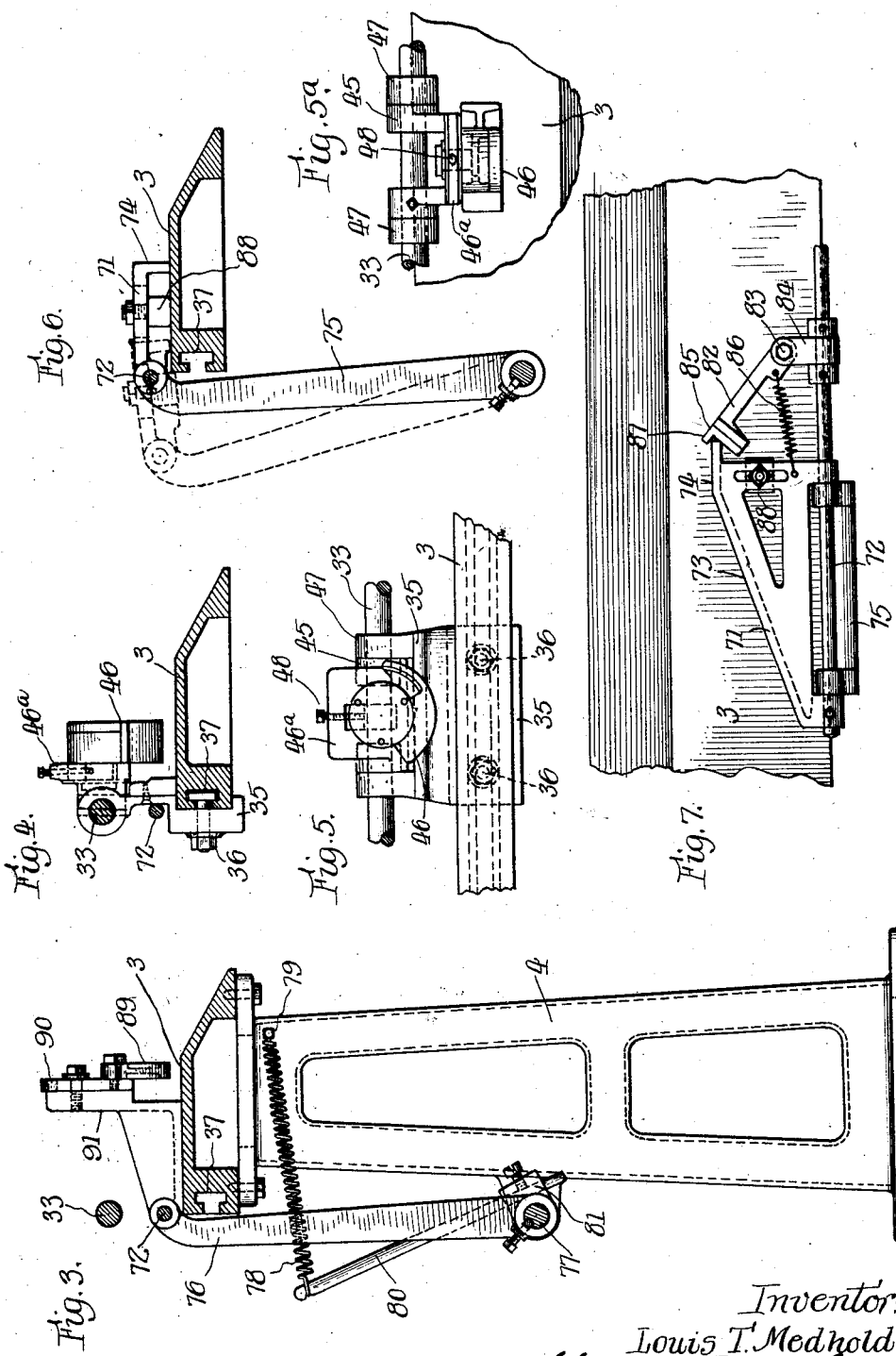

Jan. 8, 1929. 1,698,412
L. T. MEDHOLDT
MOLDER
Filed May 22, 1925 6 Sheets-Sheet 4
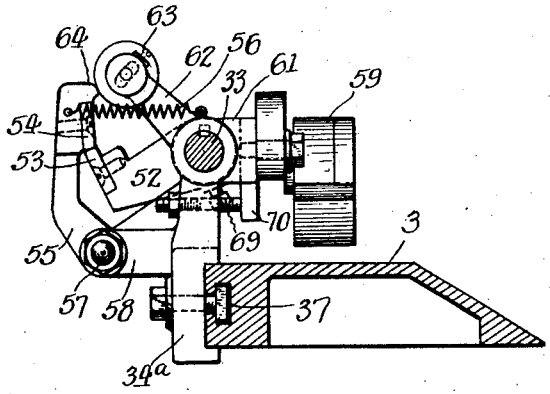
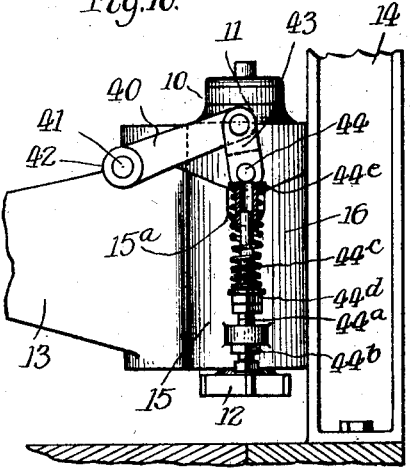
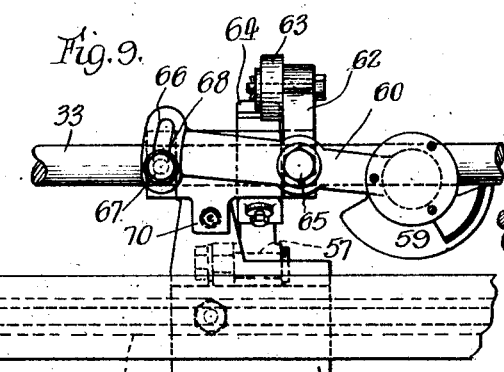
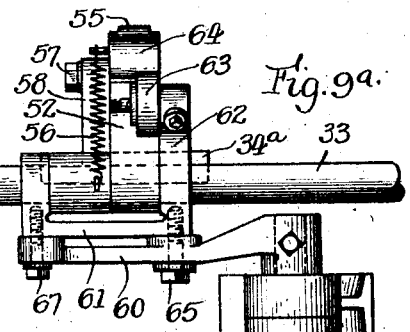
Inventor:
Louis T. Medholdt

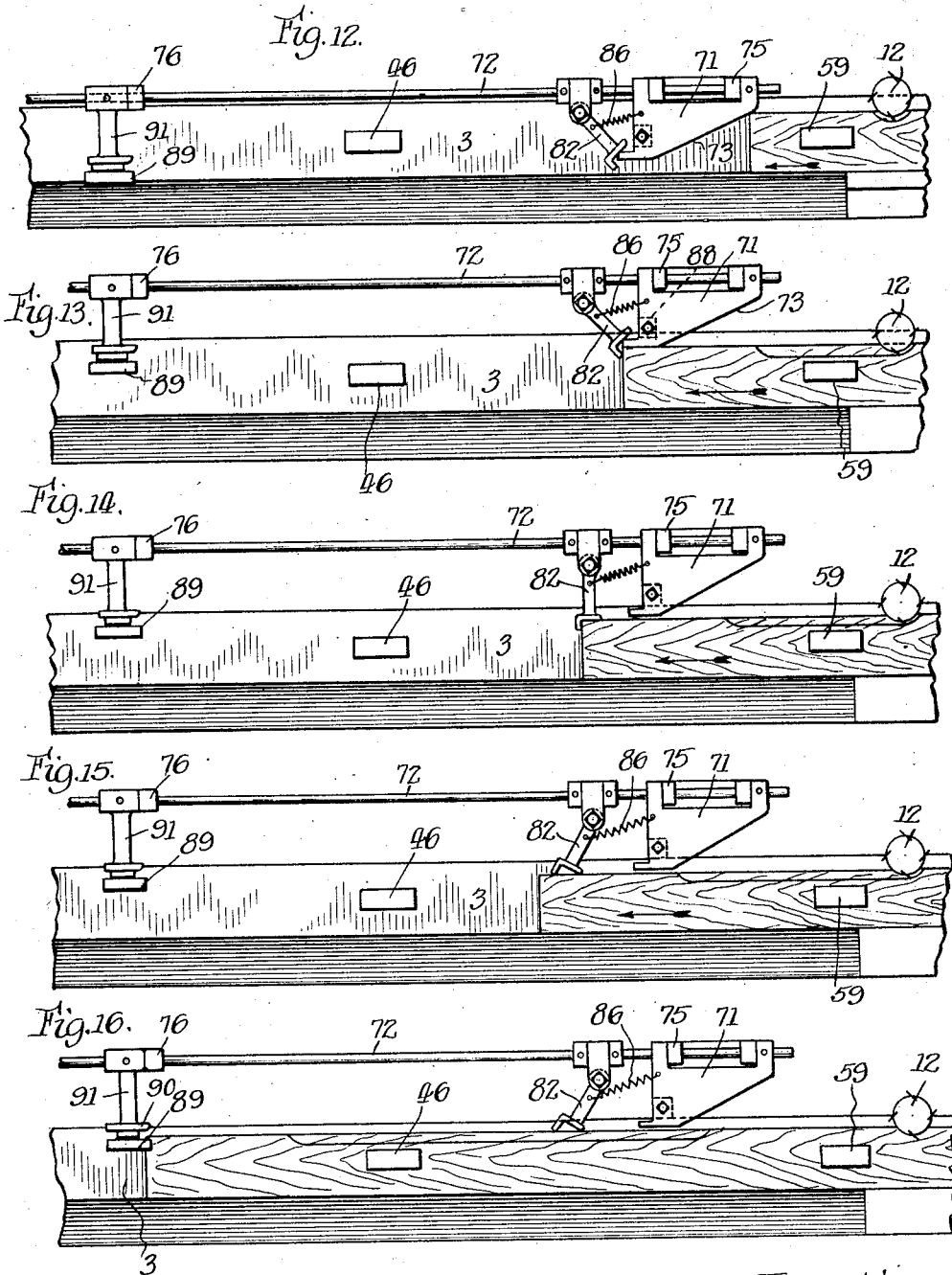

Jan. 8, 1929. 1,698,412
L. T. MEDHOLDT
MOLDER
Filed May 22, 1925   6 Sheets-Sheet 6
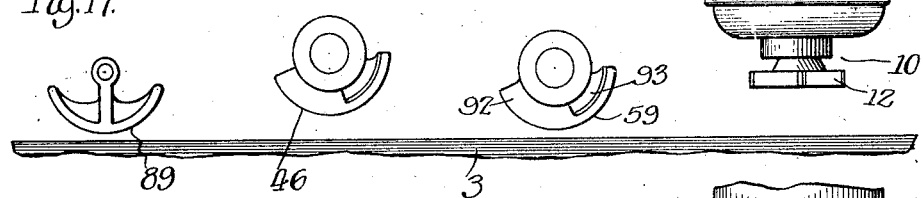
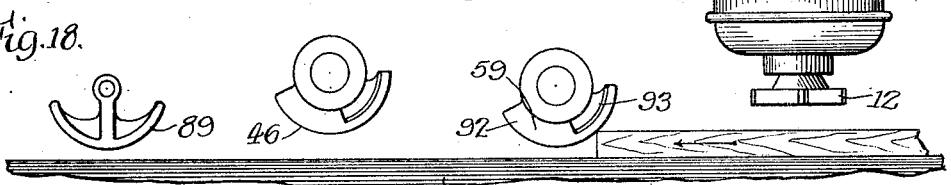
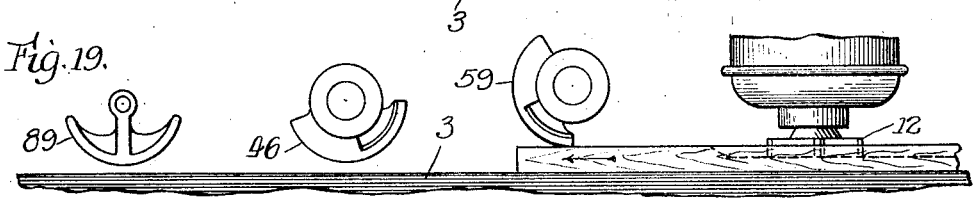
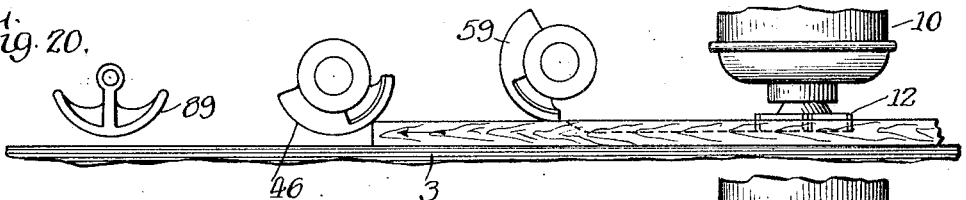
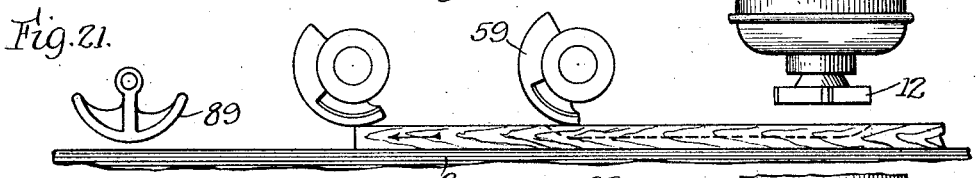
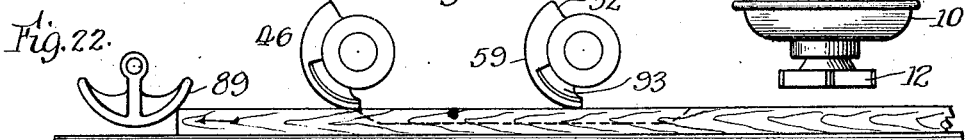
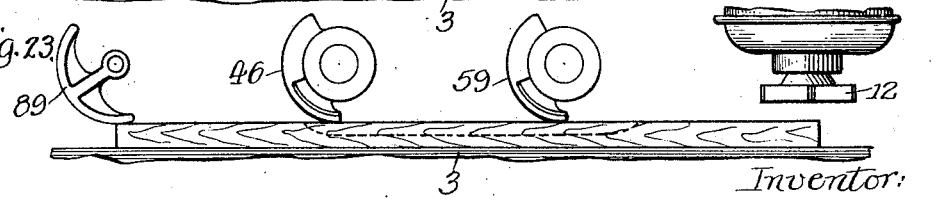
Inventor:
Louis T. Medholdt Patented Jan. 8, 1929.

1,698,412

UNITED STATES PATENT OFFICE.

LOUIS T. MEDHOLDT, OF ROCKFORD, ILLINOIS, ASSIGNOR TO MATTISON MACHINE WORKS, OF ROCKFORD, ILLINOIS, A CORPORATION OF ILLINOIS.

MOLDER.

Application filed May 22, 1925. Serial No. 32,013.

The invention relates to wood working machines of the molder type, and the object of the invention generally stated is to produce in combination with a molder or the like an auxiliary cutter means operating on the work as it passes from the molder to perform an additional cut such for example as a rabbet groove in one edge of the work.

More specifically stated, one object of the invention is to provide in a molder or the like a cutter mounted for movement into and out of engagement with the work in combination with means for automatically controlling the position of the cutter with respect to the work so as to produce a cut of a length less than that of the work such as is commonly known in the art as a stop rabbet, stop chamfer, etc.

Still another object is to provide an auxiliary cutter of the character stated in which the automatic controlling means therefor is governed solely by the work passing through the machine.

Another object of the invention is to provide in combination with the automatic controlling means, means for ejecting the finished work from the machine so as to effect the restoration of the control elements to their initial positions subject to engagement and operation by the succeeding piece of work.

A general object of the invention is to produce a construction and arrangement for the auxiliary cutter and its control mechanism which is generally simple in character, and certain and effectual in operation.

In the accompanying drawings, I have shown by way of illustration my invention as applied to a molder, and while the construction and arrangement set forth is of a preferred character, it is contemplated that various changes may be made by those skilled in the art without departing from the spirit and scope of the invention as expressed in the appended claims.

Figure 1 of the drawings is a fragmentary side elevational view of an auxiliary cutter attachment embodying my invention applied to the rear end of a molder.

Fig. 1$^a$ is a plan view showing diagrammatically a molder of ordinary construction with the auxiliary cutter attachment.

Fig. 2 is a fragmentary transverse sectional view on an enlarged scale taken approximately in the plane of line 2—2 of Fig. 1.

Figs. 3, 4 and 6 are respectively transverse sectional views taken in the planes of lines 3—3, 4—4 and 6—6 of Fig. 1.

Fig 5 is a fragmentary plan view of the parts shown in Fig. 4.

Fig. 5$^a$ is a fragmentary detail plan view showing the parts of Fig. 5.

Fig. 7 is a fragmentary plan view of the parts shown in Fig. 6.

Fig. 8 is a vertical transverse sectional view taken in the plane of line 8—8 of Fig. 1 and illustrating the means operating under the control of the work for moving the auxiliary cutter unit into operative relation to the work.

Fig. 9 is a fragmentary side view and Fig. 9$^a$ is a plan view of the means shown in Fig. 8.

Fig. 10 is a fragmentary transverse sectional view taken approximately in the plane of line 10—10 of Fig. 1 and showing a counter-balancing means for the auxiliary cutter unit.

Fig. 11 is a fragmentary horizontal sectional view on an enlarged scale taken approximately in the plane of line 11—11 of Fig. 2.

Figs. 12 to 16 are fragmentary plan views diagrammatic in character illustrating the operation of the work ejector means.

Figs. 17 to 23 inclusive are fragmentary side views diagrammatic in character illustrating the operation of the several control devices employed to determine the position of the auxiliary cutter unit.

While I do not intend to limit my invention to use for producing a rabbet groove in one edge of a piece of work, it is more especially adapted for this purpose and I will herein describe the attachment as it operates to perform this special function.

The molder selected for purposes of illustration comprises a main frame 1 (Fig. 1$^a$) to the rear end of which is secured an auxiliary frame 2 providing an elongated table 3 supported upon uprights 4 in continuation of the upper surface of the main frame 1. The work is fed into the molder by suitable means including a pair of feed rolls 5 and 6, and is guided by suitable guiding means 6$^a$ first beneath a top cutter head 7 thence successively into engagement with side cutter heads 8 and 9 and finally beneath the auxiliary or groove-cutting unit generally designated by the numeral 10 mounted for up and down movement above one end of the elongated table 3 of the auxiliary frame 2.

The auxiliary cutter unit 10 comprises an electric motor 11 upon the driving shaft of which, at the bottom side of the motor, is mounted a cutter head 12. 13 is a supporting frame (Figs. 2 and 11) extending transversely of the rear end of the molder bed and mounted at opposite ends for up and down adjustment in a pair of standards 14. Between its ends the frame is constructed to provide a pair of bracket arms 15 and 16 which extend rearwardly in the form of a semi-circle, their free ends being constructed to provide vertical ways 17 and 18 in which slide guide members 19 rigid with the opposite sides of the motor casing.

The means for adjustably supporting opposite ends of the bracket 13 may be of any suitable character, but preferably it is such as to provide for the synchronous movement of both ends. Thus, referring to Figs. 2 and 11, it is herein shown as consisting of a pair of blocks 20 mounted in the standards 14 and having screw-threaded engagement with the screws 21 journalled in the standards and each having at their upper ends beveled pinions 22 meshing with pinions 23 and 24 on a transverse shaft 25 one end of which is squared as at 26 to receive an operating crank or wrench. The opposite ends of the frame are secured to the blocks 20 by means of bolts 27 entered through elongated slots 28 and 29 in the frame member; and the latter is extended at one end as shown in Fig. 11 and bent perpendicularly to provide a bearing 30 for an adjusting screw 31 operatively engaging with the block 20 so as to be capable of moving the frame transversely when the bolts 27 are loosened. The standard 14 through which the screw 31 passes is slotted as shown in dotted lines at 32 in Fig. 11 to permit of the up and down adjustment of the frame.

Means is provided for normally supporting the auxiliary cutter unit 10 in elevated position above the work as it passes from the molder proper onto the table 3 of the groove cutting attachment; and this means is arranged to be controlled by the work to effect the descent of the auxiliary cutter unit at a predetermined point in the travel of the work into operative engagement therewith so as to perform the desired auxiliary cutting operation on the work. This means comprises a rock shaft 33 which is mounted at one edge of and extends longitudinally along the table 3 of the auxiliary frame 2, suitable brackets 34, 34ª and 35 being secured to the table as by means of bolts 36 having heads operating in an under-cut or T-shaped slot 37 formed in the table. This rock shaft 33 has rigid with its forward end an arm 38 pivotally connected by an adjustable link 39 with one of a pair of arms 40 (Figs. 2 and 11) mounted at opposite ends of a stud shaft 41 journalled in the frame 13 to turn on a horizontal axis extending longitudinally of the table 3, the frame being constructed to provide for this purpose an elongated bearing 42 at opposite ends of which the arms 40 are located.

Said arms 40 extend to a point substantially centrally of the driving motor 11 and are pivotally connected to the motor casing by means of links 43 the latter being pivotally mounted on opposite sides of the motor casing through the medium of pivot studs 44. To limit the descent of the motor and hence determine the operative position of the cutter head 12, one of the studs 44 is arranged to enter a notch or recess 15ª (Fig. 10) in the frame until it strikes the upper end of a stop screw 44ª adjustably secured in a suitable lug on the frame and locked by a nut 44ᵇ. To assist the control mechanism operated by the work to raise the cutter head a counterbalancing spring 44ᶜ is provided acting between a thimble 44ᵉ slidable on a reduced upper portion of the screw 44ª and a nut 44ᵈ carried by the lower end of the screw. The spring, it will be understood is so tensioned as to counterbalance only partially the weight of the auxiliary cutter unit, in order to permit the descent thereof by gravity when released by the control mechanism to be now described.

Near the rear end of the rock shaft 33 where it passes through its supporting bracket 35, is rigidly secured a bearing bracket 45 (Figs. 4, 5 and 5ª) carrying an interrupted indexing roll 46 constituting an arcuate control element. Said interrupted roll 46 is mounted to turn on a pivot in the bracket 45, the latter being U-shaped in form with its arms entered between upstanding bearing portions 47 on the bracket 35. The pivotal stud for the roll 46 is mounted in an upright portion 46ª of the U-shaped bracket member, and means including an adjusting screw 48 may be provided for adjusting a bearing box for the pivotal stud in said upright portion to vary the position of the roll with respect to the table 3.

Referring now to Figs. 1 and 2, it will be apparent that the movement of a piece of work beneath the interrupted roll 46 will rock the shaft 33 in a counterclockwise direction (Fig. 2), with the result that an upward lifting force will be applied to the arms 40 and to the auxiliary cutter unit 10, through the medium of the links 43, thus elevating the unit and its cutter head 12 relative to the table 3.

Referring now to Figs. 8, 9 and 9ª, I have provided means operating to latch and hold the motor 11 and the cutter unit 10 in elevated position when thus raised by the interrupted roll 46. This means comprises a downwardly and rearwardly extending arm 52 (Fig. 8) rigid with the shaft 33 and carrying a plate 53 at its rear end adapted to engage with a latch member 54 of an arm 55 drawn by a contractile spring 56 into a position above the plate 53. The arm 55 is mounted to turn on a pivot 57 carried by a rearwardly extending arm 58 on the bracket 34ª for the shaft 33. Thus it will be seen that the movement of a piece of work beneath the interrupted roll 46 at the rear end of the table 3 will operate to rock the shaft 33 so as to elevate the auxiliary cutter unit 10 and the latch 53—54 will automatically operate to hold the said unit in elevated position.

When a piece of work passing from the molder proper arrives at the proper position with respect to the auxiliary cutter unit 10, the latter is caused to descend into operative engagement with the work by means comprising a second interrupted indexing roll 59 mounted to turn on one end of an arm 60 which in turn is rigid with a U-shaped bracket 61 (Fig. 9ª) loose on the shaft 33 and having an upwardly and rearwardly extending arm 62 carrying a roller 63. The arm 55 carrying the latch member 54 has a rounded nose 64 at its upper end (Fig. 8) adapted to be engaged by the roller 63. Hence when the work passes beneath the interrupted roll 59, it swings the bracket 61 and the arm 62 so that the roller 63 forces the arm 55 rearwardly carrying the latch member 54 out of engagement with the plate 53 on the arm 52 and thus allowing the shaft 33 to rotate in a clockwise direction under the weight of the auxiliary cutter unit operatively connected thereto.

The arm 60 is mounted as best shown in Figs. 9 and 9ª upon the two arms of the bracket 61 so as to be adjustable thereon to vary the height of the roll 59 relative to the table 3. In the present instance the said arm 60 is mounted on a stud 65 carried by the forward end of the bracket arm 62, and the rear end of the arm 60 is slotted as at 66 to receive a stud 67 having a nut 68 thereon whereby the said arm 60 may be clamped in any desired position of adjustment. To limit the downward swinging movement of the roll 59 and to determine the position of the latch operating roller 63, a stop screw 69 may be provided in the bearing bracket 34 which screw is adapted to engage a depending flange 70 rigid with the bracket 61.

The arrangement employed, it will be observed, is such that the indexing roll 59 normally occupies a position such that it is spaced from the top of the table 3 a distance substantially less than the thickness of the work passing through the machine, and when the roll 46 is in its operative position it is similarly placed. Consequently when the work rides beneath the first indexing roll 59 it is elevated by the work sufficiently to disengage the latch 53—54 to permit the descent of the auxiliary cutter unit; and when the work engages with the second indexing roll 46 (this roll having moved into operative position with the descent of the auxiliary cutter unit) the shaft 33 is rocked to cause a re-engagement of the latch 53—54. After the rolls are thus elevated by the work they ride upon the upper surface thereof and before they can return to their normal positions, (the groove cutting operation having been completed) the work must be ejected from the table. I provide therefore means including a pair of members 71 and 91, located at spaced points along the table, for ejecting the work upon the completion of the final cutting operation to enable the restoration of the indexing rolls to their normal positions in which they are susceptible to operation by the succeeding piece of work for the automatic control of the auxiliary cutter unit.

Referring to Figs. 6 and 7, the ejector member 71 is substantially triangular in form, slidable transversely of the table 3 near one edge thereof and secured at its outer edge on a rod 72 extending parallel to the shaft 33 a short distance below it. The inner edge of the member throughout the greater portion of its length is arranged diagonally relative to the path of travel of the work as shown at 73, and said edge terminates in a flat surface 74 parallel with the line of movement of the work. Normally the member is interposed in the path of travel of the work, the leading end of which, engaging with the diagonal surface 73 moves the member outwardly transversely of the table. The rod 72 is mounted for swinging movement to permit of such lateral motion of the ejector member. Thus it is carried by the upper ends of a pair of members 75 and 76, one of which is in the form of a frame mounted to turn on a rod 77 suitably supported in the auxiliary frame 2 below the table 3, and the other of which is in the form of an arm also mounted on said rod 77, the two members being spaced apart longitudinally of the table as shown in Fig. 1.

The movement of the ejector member 71 by the work takes place against the action of a spring 78 (Fig. 3) one end of which is anchored to one of the frame members 4 at 79. The other end of the spring is secured to the upper end of a rod 80 carried by a bracket 81 fast on the shaft 77 with which the members 75 and 76 are rigidly secured.

Associated with the ejector member 71 is a latch device also actuated by the work in its travel longitudinally of the table 3. This device (Fig. 7) comprises an arm 82 pivoted at 83 upon a member 84 mounted on the rod 72 adjacent the member 71. The free end of the arm 82 carries an angular plate 85 providing a notch in which an extension of the flat surface 74 of the ejector member normally lies. A light contractile spring 86 serves to hold the arm 82 in such normal position and it will be observed that in this position the plate 85 has an inwardly projecting lip portion 87 which is adapted to be engaged by the leading end of the work as it passes the ejector member 71. When thus engaged by the work, the arm 82 is swung through the arc of a circle and in such movement the arm together with the member 84 operates as a toggle, the parts of which when straightened cause the rod 72 to swing outwardly away from the table carrying with it the ejector member 71. Upon the underside of the latter is an adjustable latch member in the form of a block 88 which is so positioned that as the member 71 moves outwardly under the action of said toggle it engages with the outer edge of the table as shown in dotted lines in Fig. 6, so as to lock the ejector member in a position spaced a short distance from the work (see Fig. 14). As the work travels on in its movement toward the end of the table the arm 82 travels with it, and ultimately the free end of the arm disengages from the end of the work and slides along the outer edge of the work as shown in Fig. 15.

When the auxiliary cutting operation has been completed the leading end of the work enters beneath a trip mechanism for the ejector means to operate it. This trip mechanism (Figs. 1 and 3) is herein shown as comprising an interrupted roll 89 adjustably mounted through the medium of a slotted bar 90 on a member 91 rigid with the rod 72 at the upper end of the arm 76. This member 91 constitutes the other ejector member hereinbefore referred to. Thus, being mounted on the shaft 72 with the member 71, it moves therewith and when the work engages the roll 89 to rock the shaft 72, the latch block 88 is disengaged from the edge of the table and both members 71 and 91 are rapidly moved inwardly under the action of the spring 78 so as to strike the work a sharp blow sufficient to remove it forcibly from the table transversely thereof. Thereupon the rolls 59 and 89, being unsupported against the action of gravity, may descend into their normal positions with respect to the upper surface of the table and in the path of movement of the succeeding piece of work. The roll 46, however, is held raised by the latch 53—54 until the latter is released by the engagement of the work with the roll 59.

The rolls 46, 59 and 89, it will be observed, are constructed to provide arcuate bearing surfaces having radii of substantial length so that the degree of curvature is relatively small and hence well adapted for engagement by the sharp or square cornered end of the work. Thus as shown in Fig. 18, each roll provides a cam surface which when disposed in the path of movement of the work will readily ride upwardly thereon into the positions shown in Figs. 19 to 23, and in thus riding up on the work will effect an upward movement of the desired extent to the particular control element governed thereby. The interrupted character of each of the rolls causes it, by reason of the greater mass at one side of the pivotal axis than the other, to assume a normal operative position when permitted to do so by the absence of a piece of work from beneath the rolls; and preferably the rolls 46 and 59 have the foremost portions of the segmental portions 92 cut away as at 93 and thus reduced in mass so that such end portions normally are raised slightly above the rear ends of said segmental portions.

Referring now to Figs. 1, 1ª, 17 to 23 and 12 to 16, the operation of the machine is as follows:

The work is fed by the molder feed rolls 5 and 6 first beneath the top cutter head 7 and thence between the side cutter heads 8 and 9 to finish and reduce the work to the proper size and shape preliminary to the final operation to be performed by the cutter head 12. Inasmuch as the successive pieces of work are arranged in abutting end relation, the molder feed mechanism operates to move the work entirely through the machine regardless of the length of the work. The machine as herein shown does not embody the usual bottom cutter head for surfacing the under side of the work, the stock as furnished having one smooth or finished side. In its passage through the molder proper the work is guided by the usual guiding means and such guiding means continue to function to hold the work in position during the operation of the auxiliary cutter unit 10.

Normally the parts of the groove cutting attachment occupy the relation shown in Fig. 17 with the auxiliary cutter unit 10 elevated and the first indexing roll 59 lowered so as to be interposed in the path of travel of the work. The positions of the indexing rolls 59 and 46 longitudinally of the table 3, having been determined with regard to the length of the groove to be cut, the leading end of the work first strikes the roll 59 forcing the same upwardly and rocking the bracket 61 (Fig. 8) and its arm 62 on the shaft 33 in a direction to force the lever 55 rearwardly and thus disengage the latch 53—54. The arm 52 which is fast on the shaft 33 now turns in a clockwise direction (Fig. 2) with the result that the auxiliary cutter unit 10 descends by the action of gravity to carry the cutter head 12 into engagement with the work, the extent of descent being limited by the stop screw 44ª mounted in the frame 13. The work is now fed along the table 3 with the roll 59 idling thereon (Figs. 19 and 20), and when the desired length of groove has been cut the forward end of the work engages the roll 46 which, riding up on the work (Fig. 20), swings the bracket 45 and with it the rock shaft 33 in a counterclockwise direction so as to elevate the auxiliary cutter unit 10 through the medium of the linkage connecting it with the shaft (Fig. 2). At the same time the latch arm 52 is swung downwardly to permit the lever 55 to swing forwardly under the action of the spring 56 and thus effect the re-engagement of the latch 53—54. In the upward movement of the auxiliary cutter unit, the cutter head 12 moves into the position shown in Fig. 21 and thus the groove cutting operation is discontinued.

Prior to the engagement of the work with the second indexing roll 46, however, it engages with the inclined surface 73 of the ejector member 71 (Figs. 7, 12 and 13) in the operation of setting or cocking the latter preliminary to the final ejecting operation. In passing from the inclined surface 73 the end of the work engages with the notched end of the arm 82 and the continued movement of the work causes this arm to move into perpendicular relation to the path of travel of the work in which it operates upon the rod 72 carrying the member 73 to move the latter a short distance away from the near edge of the work. At the same time the auxiliary ejector member 91 is similarly moved to one side of the path of movement of the work. Such movement of the rod or shaft 72 takes place against the action of the spring 78 (Fig. 3), and in the final portion of the movement effected by the arm 82 the latch block 88 on the under side of the member 73 moves into holding engagement with the edge of the table 3. Subsequently the arm 82 idles along the edge of the work as shown in Figs. 15 and 16.

Upon the completion of the groove cutting operation and the elevation of the auxiliary cutter unit, the leading end of the work passes into engagement with the interrupted roll 89 of the means for tripping the work ejector means. In this operation the roll 89 is elevated (Figs. 22 and 23) and the shaft 72 rocked in a counterclockwise direction to lift the latch block 88 free of engagement with the table thus releasing the spring 78 to action. The result is that the members 71 and 91 are caused to strike the work a sharp blow near each end, and thus forcibly remove it from beneath the several rolls. Thereupon the latter automatically assume the positions shown in Figs. 17 and 18, ready for a repetition of the operation.

It will be observed that the entire operation upon the work including the formation of the rabbet groove or other type of cut is performed in one passage of the work through the machine. Heretofore, so far as I am aware, the operation of producing a stop rabbet or similar cut of a length less than that of the stock has required either a separate passage and hence handling of the work, or the use of a template on each piece of stock for controlling the position of the cutter; and I believe that I am the first to have produced an auxiliary cutter means controlled by the work itself as it passes from the molder or the like to accomplish this desired result. The ejection of the work from the machine serves, it will be apparent, the important function of allowing the controlling elements to return to operative position without in any way interrupting the feeding operation or preventing the work from being fed through the molder in abutting end relation.

I claim as my invention:

1. The combination of a molder or the like adapted to operate successively upon pieces of work fed in abutting end relation, an auxiliary cutting means movable into and out of engagement with the work and controlled by the advance end of the work during the movement of the work through the machine, and ejector means having a holding device releasable by the work upon the completion of the auxiliary cutting operation on a piece of work to permit said ejector means to impart a movement thereto independent of the working feed.

2. The combination of a molder having means for feeding the work, means for cutting a rabbet groove in one edge of the work including a cutter mounted for movement into and out of engagement with the work, means for automatically effecting the movement of the cutter into and out of engagement with the work at predetermined points in its length, the last mentioned means including a plurality of control elements arranged to be operated successively by the work in its movement, and means for imparting a movement to the finished work independent of the normal feeding movement for moving the work out of operative association with said control elements.

3. An auxiliary cutting means for molders or the like comprising, in combination, a table, a cutter mounted for movement toward and from said table, and a pair of indexing devices spaced longitudinally of the table and respectively operating to effect the movement of the cutter into and out of engagement with the work on the table, said devices including movably mounted shoes for contacting the work arranged when disengaged from the work automatically to assume their normal positions.

4. An auxiliary cutting means for molders or the like comprising, in combination, a table, a cutter mounted for movement toward and from said table, a pair of indexing devices spaced longitudinally of the table and respectively operating to effect the movement of the cutter into and out of engagement with the work on the table, said indexing devices being arranged to be operated by the work and being automatically returnable to normal position upon disengagement from the work, and ejector means for disengaging the work from said devices including a trip device arranged to effect the operation of the ejector means at a predetermined point in the travel of the work.

5. An auxiliary cutting attachment for molders and the like comprising, in combination with a cutter mounted for movement into and out of operative relation to the work, a pair of indexing devices respectively operating at predetermined points in the travel of the work to effect the movement of the cutter into and out of engagement with the work, and spring actuated means releasable subsequently to the movement of the second indexing device to eject the work by a movement other than the normal feeding movement and thereby place said indexing devices in condition for controlling the cutter for operation upon a succeeding work piece.

6. An auxiliary cutting means for molders and the like comprising, in combination, a table, an upright frame at one end of the table, a cutter head mounted for up and down movement in said frame, a rock shaft parallel to the table, a latch device normally operating to hold said rock shaft against rotation and thereby to maintain said cutter head in elevated position, a control element operating at a predetermined point in the travel of the work to release said latch device to permit the descent of the cutter head into engagement with the work, and a second control element operating at another point in the travel of the work to elevate the cutter head out of engagement with the work, said latch device operating to rock said shaft in a direction to elevate the cutter head to hold it in inoperative position.

7. The combination of a table, a frame at one end of the table, a cutter head mounted for up and down movement in said frame, means for controlling the position of the cutter head relative to the table comprising a rock shaft extending parallel to the table, means arranged to be moved by a piece of work in its passage over the table to rock said shaft in a direction to raise said cutter head to its inoperative position, an arm rigid with said shaft, a latch member adapted to engage with said arm when the cutter head is raised whereby to hold the head in elevated position, and a control device arranged to be moved by the work in its passage along the table to disengage said latch member from said arm.

8. The combination of a work table, a cutter head mounted for up and down movement relative to said table, a rock shaft operatively connected with said cutter head to move it, an arm fast on said shaft, a latch member normally engaging with said arm to hold said shaft against rotation and thereby hold the cutter head in elevated position, and a control element arranged to be moved by the work as it passes along the table to disengage said latch member from said arm to permit the cutter head to descend into engagement with the work.

9. The combination of a work table, a cutter head mounted for up and down movement relative to said table, a rock shaft operatively connected with said cutter head to move it, an arm fast on said shaft, a latch member normally engaging with said arm to hold said shaft against rotation and thereby hold the cutter head in elevated inoperative position, and a control element arranged to be moved by the work as it passes along the table to disengage said latch member from said arm, said control element comprising a member free to turn on said shaft, a part carried by said member adapted to be engaged by the work, and a second part carried by said member and adapted to engage said latch member.

10. The combination of a table, a cutter head mounted for movement toward and from said table, a rock shaft operatively connected with said cutter head to move it, a member rigid with said rock shaft and arranged to be moved by the work in its travel along the table in a direction to effect the elevation of said cutter head, and a latch device operable automatically in such rotation of the rock shaft to lock the same against movement in a direction to permit the descent of the cutter head.

11. The combination of a table, a cutter head mounted for movement into and out of operative engagement with a piece of work moving along the table, means operable by the work and in the movement of the work at predetermined points in its travel to effect first the descent of the cutter head into engagement with the work and then the withdrawal of the cutter head from the work to its inoperative position, and means for moving the work out of relation to said control elements comprising an ejector movable in the travel of the work into a position at one side of the work, a spring tending to move said ejector toward the work, a latch operating to hold said ejector against movement by the spring, and a trip device operable by the work for releasing said latch at a predetermined point in the travel of the work.

12. In a machine of the character described, the combination of a table, a cutter head, means arranged to be operated by the work and in the movement of the work along the table to govern the position of the cutter head relative to the table and the work thereon, said means including a control element arranged to be operated by the advance end of the work, an ejector member mounted for movement laterally of the path of travel of the work, a spring normally tending to move the ejector member toward the work, means operable by the work in its travel to move said ejector member into cocked position at one side of the work, and a trip mechanism operating at a predetermined point in the travel of the work to release said ejector member for movement by said spring.

13. The combination of a work table, cutter means arranged to operate upon work moving along the table in abutting end relation, control mechanism for the cutter, means for determining the position of the cutter relative to the work, a rock shaft extending parallel to the table, an ejector member overlying the table and mounted on said shaft, said shaft being mounted for lateral motion relative to the table, means tending to move said shaft in a direction to carry the ejector member toward the work, a latch operating to hold said ejector member away from the work, and a trip device for rocking said shaft whereby to release said latch.

14. The combination of a work table, cutter means arranged to operate upon work moving along the table, control mechanism for the cutter, means for determining the position of the cutter relative to the work, a rock shaft extending parallel to the table, an ejector member overlying the table and mounted on said shaft, said shaft being mounted for lateral motion relative to the table, means tending to move said shaft in a direction to carry the ejector member toward the work, a latch operating to hold said ejector member away from the work, and a trip device for rocking said shaft whereby to release said latch, the means for moving the ejector member away from the work including an arm pivotally secured to said rock shaft so as to turn on a vertical axis and arranged to be engaged by the work in its travel for movement from an oblique position with relation to the path of travel of the work into a position perpendicular to said path of travel.

15. In a machine of the character described the combination of a work table, cutter means, control mechanism for the cutter means, and means for moving the work relative to said control mechanism including a transversely movable ejector member having a diagonally disposed surface arranged to be engaged by the work so as to be moved thereby transversely of the table, an arm mounted in pivotal relation to said member and also adapted to be engaged by the work, spring means for tending to move said member toward the work, the arrangement being such that in the swinging movement of said arm the ejector member is moved free of the work, means for releasably holding the ejector member in the last mentioned relation to the work, and means operating at a predetermined point in the travel of the work to release said holding means.

16. In a machine of the character described the combination of a table, cutter means movable into and out of operative association with a piece of work intermediate its ends while travelling along the table and means controlled by the work in its movement along the table for governing the position of said cutter means during the passage of the work, said means including a plurality of control devices each having an interrupted roll element arranged to be engaged by the work for movement thereby and adapted upon being disengaged from the work to return to their normal positions.

17. In a machine of the character described the combination of a table, a cutter head, a supporting frame for the cutter head, means for adjusting the frame vertically with respect to the table, said cutter head being mounted for up and down movement in said frame, and means for automatically controlling the movement of said cutter head in said frame whereby to determine its position relative to the work.

18. In a machine of the character described the combination of a table, an upright standard mounted at one end of the table, a frame adjustable in said standard, a cutter head mounted in said frame for movement into and out of operative association with work on the table, said frame providing a stop adapted to limit the descent of the cutter head.

19. In a machine of the character described the combination of a work support, cutting means movable into and out of operative engagement with work fed onto said support in abutting end relation, means for controlling the movement of the cutter means arranged to be engaged by the leading end of a piece of work in its travel, and means for moving each piece of work to expose the end of the next succeeding piece of work so that it may engage said controlling means.

20. In a machine of the character described a cutter, means for feeding pieces of work in end to end relation relative to said cutter control means including a device operable upon engagement by the leading end of a piece of work for effecting the operation of said cutter thereon, and means operating upon each piece of work to expose the end of an adjacent piece of work so that it may engage said device.

21. In a machine of the character described a cutter operable successively upon separate pieces of work fed in end to end relation, control means for the cutter including a device operable by relative movement between it and the work, and means for moving each piece of work relative to the other pieces of work to render the control device operative.

In testimony whereof, I have hereunto affixed my signature.

LOUIS T. MEDHOLDT.